INVENTOR
ANDRÉ QUENOT

3,473,235
END ATTACHMENT FOR LINEAR TAPE MEASURES

André Quenot, Besancon, Doubs, France, assignor to Quenot & Cie, S.a.r.l., Besancon, Doubs, France, a French company
Filed Nov. 1, 1966, Ser. No. 591,229
Claims priority, application France, Apr. 19, 1966, 58,231
Int. Cl. G01b 3/02, 3/10
U.S. Cl. 33—137     1 Claim

ABSTRACT OF THE DISCLOSURE

An attachment for a tape end having four reinforcing plates to one of which are pivoted about the same axis a pull out ring and a spring biased hook.

---

Already known are linear tape measures which have on the free end of the pull-out ring, a hook permitting to immobilise the end of the tape in order to facilitate the measurement. These hooks do not make possible generally an accurate measurement when they are used, since the origin of the graduation does not coincide with the connection of the hook. Furthermore, when the origin of these graduations corresponds with the joint axis of the hook, the measurement is also inaccurate if one does not use it. Additionally, generally, the hooks in their inoperative position are folded back on the pull-out ring and thus prevent that the finger be passed threthrough thus preventing an efficient use of the ring.

These linear tape measures are stored when not used in a casing or the like and only the pull-out ring bearing a hook at its free extremity remains outside thus exposed to shocks and to torsion movements which result in the warping, folding or tearing of the tape and consequently render all accurate use impossible. Further, the manufacture and the assembly of the ends of the tape bearing the pull-out ring is long and difficult if it is desired to give efficient strength to the end of the tape. There must be introduced simultaneously in a narrow fork the tape and the reinforcing plate which bear holes and to make the holes coincide with those of the fork, to introduce rivets to the assembly in order to give rigidity to the assembly.

Consequently, the invention proposes to obviate to all these drawbacks and to provide a hook for the end of linear tape measures which will permit a simple rapid and accurate measurement which can be made with one hand, and which will have increased solidity, a simpler fabrication and assembly.

The invention also provides an inexpensive device having an improved appearance and which furthermore can comply with the specification of the department of measuring instruments in the case where like in France, the regulation requires that the origin of graduations be at the end of the securing plate for the pull-out ring of the tape.

The invention is concerned with a linear measuring tape having at its extremity a retractable hooking device, characterised in that the pivoting axis of the hook is identical with hte joint axis of the pull-out ring.

The invention will be understood by reference to the following description made by way of non-limiting example and to the annexed drawing in which.

Figure 1:
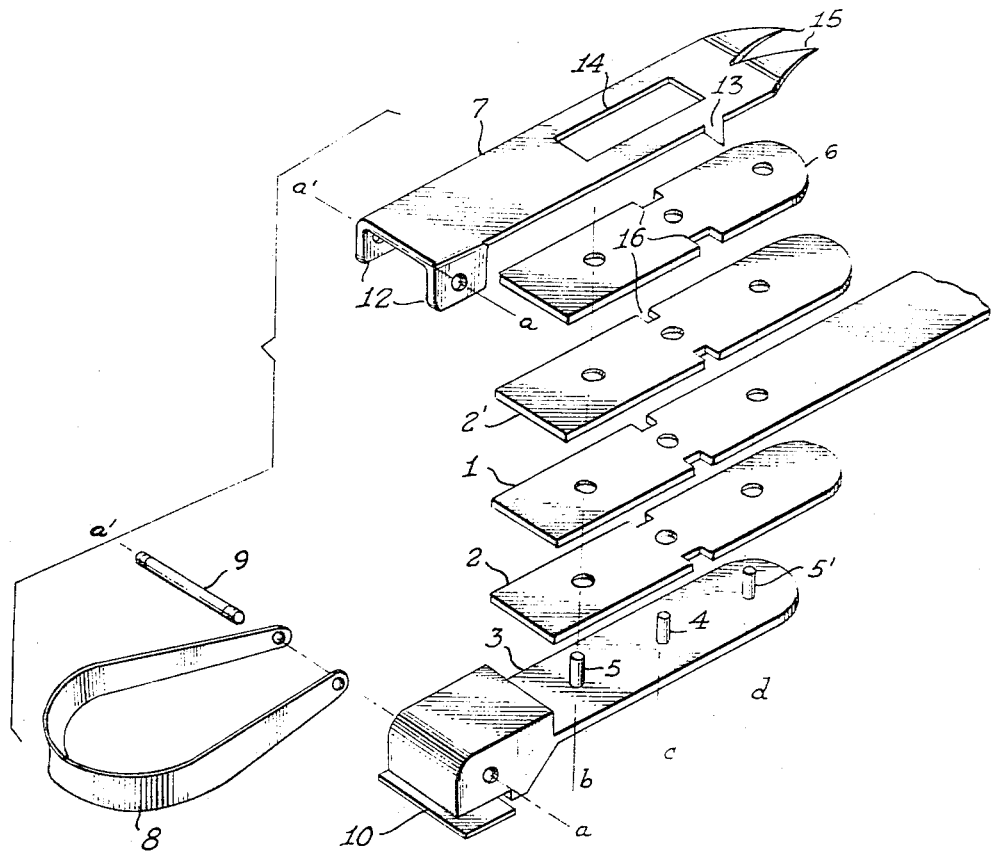
FIGURE 1 is a exploded perspective view.
Figure 2:
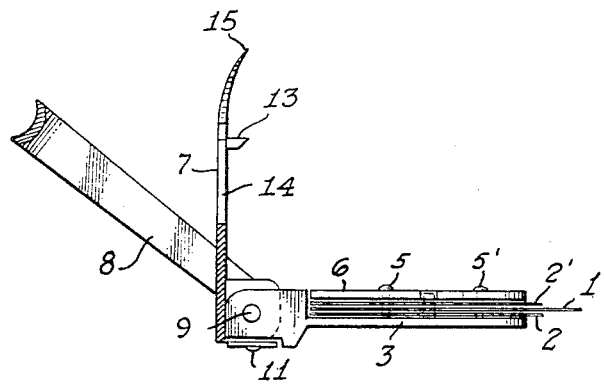
FIGURE 2 is an elevational partially cross-sectional view.

The tape measure 1 is framed by two reinforcing plates 2 and 2' and fits, by means of orifices, on plate 3 which carries three cylindrical lugs 4, 5 and 5'. The upper bearing plate 6 also comes to rest on the lugs. The central lug 4 only serves to position the members one with respect to the other; the other two lugs 5 and 5', a little longer, serve additionally for the riveting of the assembly, the lugs 5 and 5' being on a line (respectivetely on the axis $b$ and $d$ and the centering lug 4 on axis $c$). Window 14 permits to position the hook on bearing plate 6 despite the tip of rivet 5. Rivet 5' fits between teeth 15.

Hook 7 is mounted, as well as the pull-out ring 8, on the swivel pin 9 having a threaded axis $a-a'$ and whose extremities are carried by the enlarged section of bearing plate 3.

Spring plate 10 mounted in a shoulder of bearing plate 3, secured by means of at least one rivet 11, acts on the ears 12 of hook 7 in order to maintain it in its operative and inoperative position.

The teeth 13 of hook 7, in their inoperative position, fit in the slot 16 of plate 6, of plates 2 and 2' and of tape 1.

The origin of the graduation is identical with the end of plate 3. The teeth 13 are adapted to dig into the material measured and the first graduations (not shown) can be engraved on the visible face of the plate 3. The width of a part of hook 7 is greater to that of plates 3 and 6 of reinforcing plates 2 and 2' and of plate 1 making it easy to bring hook 7 in its operative position.

While the invention has been described with respect to a particular embodiment thereof, it will be understood that the invention is not in any way limited thereto and that there can be brought many modifications in the shape, details and material without departing from the spirit and the scope of the invention.

What is claimed is:

1. In combination with a measuring tape having a plurality of openings and a pair of side slots near one end thereof, an end attachment comprising: a plate member terminating in an end section of augmented thickness and a given width, fastening means carried by said plate member, a first reinforcing plate resting on said plate member and a second reinforcing plate, said end of said tape being positioned with the openings thereof traversed by said fastening means, and a top plate above said second reinforcing plate, said first, second and top plates having openings and slots corresponding to said openings and slots of said tape; said fastening means passing through all of said openings of the aforesaid plates to secure said tape to said plate member; pivoting means in said end section of said plate member, a spring plate wider than said end section and having lateral portions overlapping said section; a pull out ring pivotably connected to said pivoting means at the extremities of said ring; said ring being limited in its downward movement by said lateral portions of said spring plate; a hook member having side teeth adapted to penetrate a material to be measured and fitting in said side slots of said tape and plates when not in use; said hook further having at one end thereof points curved toward said tape and at the other end, side ears pivotably connected to said pivoting means around said extremities of said ring, said spring plate bearing by said lateral portions against said ears to maintain said hook against said top plate when said hook is not in use.

References Cited

UNITED STATES PATENTS

| | | | |
|---|---|---|---|
| 558,113 | 4/1896 | Rodick | 33—137 |
| 2,574,272 | 11/1951 | McCully | 33—137 |
| 1,380,184 | 5/1921 | Brandenburg | 33—138 |
| 2,105,149 | 1/1938 | Keuffel | 33—137 |
| 2,410,713 | 11/1946 | Carlson. | |
| 1,798,476 | 3/1931 | Langsner | 33—137 |

LEONARD FORMAN, Primary Examiner

S. L. STEPHAN, Assistant Examiner